(12) United States Patent
Yun

(10) Patent No.: US 7,324,003 B2
(45) Date of Patent: Jan. 29, 2008

(54) EMERGENCY ALERT MESSAGE DATA STRUCTURE, EMERGENCY ALERT MESSAGE PROCESSING METHOD AND BROADCAST RECEIVER

(75) Inventor: Chang Sik Yun, Daejeon-si (KR)

(73) Assignee: LG Electronics Inc., Seoul (KR)

( * ) Notice: Subject to any disclaimer, the term of this patent is extended or adjusted under 35 U.S.C. 154(b) by 188 days.

(21) Appl. No.: 11/181,219

(22) Filed: Jul. 13, 2005

(65) Prior Publication Data

US 2006/0015916 A1    Jan. 19, 2006

(30) Foreign Application Priority Data

Jul. 15, 2004    (KR) .................... 10-2004-0055118

(51) Int. Cl.
 *G01W 1/00* (2006.01)
 *H04N 7/10* (2006.01)

(52) U.S. Cl. .................. 340/601; 340/691.1; 725/33; 725/108

(58) Field of Classification Search ................ 340/601, 340/531, 691.1, 691, 3, 691.6; 725/108, 725/33, 34; 379/37; 455/404.1, 3.01
 See application file for complete search history.

(56) References Cited

U.S. PATENT DOCUMENTS 5,495,283 A * 2/1996 Cowe ............................ 725/33
5,825,407 A * 10/1998 Cowe et al. ................. 725/143
6,543,051 B1 * 4/2003 Manson et al. ............... 725/33
7,159,230 B2 * 1/2007 Manson et al. ............... 725/33
2003/0216133 A1 * 11/2003 Poltorak .................. 455/404.1
2006/0020992 A1 * 1/2006 Pugel et al. ................ 725/108
2006/0055527 A1 * 3/2006 Pugel ......................... 340/517
2006/0161946 A1 * 7/2006 Shin ............................. 725/33

* cited by examiner

*Primary Examiner*—Toan N. Pham
(74) *Attorney, Agent, or Firm*—Lee, Hong, Degerman, Kang & Schmadeka

(57) ABSTRACT

An emergency alert message data structure, an emergency alert message processing method and a broadcast receiver are disclosed. When a state of emergency where a channel change to an emergency broadcast channel is required occurs, a transmitting stage includes information regarding the emergency broadcast channel and emergency alert contents in text form in an emergency alert message and transmits the resulting emergency alert message. A receiving stage receives the emergency alert message and determines whether the channel change to the emergency broadcast channel included in the emergency alert message is required. If the channel change to the emergency broadcast channel is determined to be required, the receiving stage changes the current channel to the emergency broadcast channel, and displays the emergency alert contents in text form included in the emergency alert message on a portion of a screen of the emergency broadcast channel in a scrolling manner. Therefore, the viewer can more accurately recognize the state of emergency through not only emergency alert broadcast of the emergency broadcast channel which is displayed as a moving image, but also the emergency alert contents which are scrolled on the screen.

12 Claims, 3 Drawing Sheets

FIG. 2

| Alert_priority | Meaning | Audio Required |
|---|---|---|
| 0 | Test message: the alert shall be discarded by all receiving equipment except those designated to acknowledge and process test messages. | No |
| 1-2 | [Reserved] | |
| 3 | Low priority: the alert may be disregarded if processing the alert would interrupt viewing of an access-controlled service | No |
| 4-6 | [Reserved] | |
| 7 | Medium priority: the alert may be disregarded if processing the alert would interrupt viewing of a pay-per-view event. | No |
| 8-10 | [Reserved] | |
| 11 | High priority: the alert shall be processed unconditionally, but can involve text-only display if no audio is available. | No |
| 12-14 | [Reserved] | |
| 15 | Maximum priority: the alert shall be processed unconditionally. If audio is available without tuning to the details channel, that audio shall be substituted for program audio for the duration of the alert message. If audio is not available by means other than by tuning to the details channel, the details channel shall be acquired for the duration of the alert message. And the alert can involve text-display. | Yes |

EMERGENCY ALERT MESSAGE DATA STRUCTURE, EMERGENCY ALERT MESSAGE PROCESSING METHOD AND BROADCAST RECEIVER

This application claims the benefit of Korean Patent Application No. 10-2004-0055118, filed on Jul. 15, 2004, which is hereby incorporated by reference as if fully set forth herein.

BACKGROUND OF THE INVENTION

1. Field of the Invention

The present invention relates to a digital cable broadcast receiver, and more particularly, to a method for processing an emergency alert message, and a data structure of the emergency alert message.

2. Discussion of the Related Art

Generally, a digital cable set-top box is required for reception of digital cable broadcast. The digital cable set-top box is connected with a cable head-end, which is a kind of broadcasting station transmitting a digital cable program, to receive an audio/video (A/V) broadcasting program and data broadcast from the cable head-end. At this time, the A/V broadcasting program is received over In-Band among cable frequency bands, and the data broadcast is received over Out-Of-Band (OOB) among the frequency bands. In particular, the cable set-top box can perform two-way communication with the head-end over the OOB.

Broadcast protocols for transmission of channel and broadcasting program guide information may be, for example, Service Information (SI) protocol, and Program and System Information Protocol (PSIP). For the purpose of securing stability in the cable broadcast, SI is transmitted over the OOB, and PSIP information is transmitted over the in-band.

Digital cable broadcast receivers may be, for example, an open cable broadcast receiver adopted in America, a DVB-C broadcast receiver adopted in Europe, and an ISDB-C broadcast receiver adopted in Japan.

In the open cable broadcast receiver, a Point Of Deployment (POD) module with a conditional access (CA) system is separated from the body of a digital cable set-top box in order to prevent copying of high value-added broadcast content and to allow a conditional access thereto. It is thus possible to readily replace a security system with another one and retail the broadcast receiver. Therefore, the digital cable broadcast receiver has the advantage of being capable of being supplied at a low price.

The POD module is inserted in a slot of the digital cable set-top box. In this regard, the POD module is often called a cable card. The POD module and the cable card will hereinafter be used together.

Meanwhile, a cable set-top box-embedded cable broadcast receiver (for example, a cable ready digital TV) has been proposed to enable a retail sale that the open cable system pursues.

This cable broadcast receiver is a digital TV that contains a cable set-top box so that the user can receive and view all terrestrial analog broadcast, terrestrial digital broadcast, cable analog broadcast and cable digital broadcast without using a separate cable set-top box.

A basic convention is defined in the cable broadcast receiver to properly receive and process an emergency alert message if a transmitting stage transmits the emergency alert message to warn of a state of emergency.

That is, if a transmitting stage transmits an emergency alert message at a specific terrestrial frequency or cable frequency, the cable broadcast receiver receives the transmitted emergency alert message. Then, the cable broadcast receiver outputs information regarding a channel change to a specific terrestrial or cable emergency broadcast channel and an emergency alert to the TV viewer in order to effectively provide the emergency alert information to the viewer. At this time, the emergency alert information can be outputted in the form of text and/or audio. For example, when the emergency alert information is in the form of text, it may be slowly scrolled from the upper right to upper left of the screen.

On the other hand, at the time that the emergency alert is ended, the cable broadcast receiver restores the current channel from the emergency broadcast channel to the original channel, viewed by the viewer prior to the emergency broadcast channel, provided that the original channel was compulsorily changed to the emergency broadcast channel.

SUMMARY OF THE INVENTION

Accordingly, the present invention is directed to a method for processing an emergency alert message and a data structure of the emergency alert message that substantially obviate one or more problems due to limitations and disadvantages of the related art.

An object of the present invention is to provide a method for processing an emergency alert message and a data structure of the emergency alert message, wherein emergency alert contents in text form can be contained in the emergency alert message even when the emergency alert message has a priority requiring a channel change to an emergency broadcast channel.

Another object of the present invention is to provide an emergency alert message processing method and a broadcast receiver, wherein, even when the current channel is changed to an emergency broadcast channel contained in a received emergency alert message, emergency alert contents in text form are scrolled on the screen if they are present in the received emergency alert message.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data structure of an emergency alert message comprises an emergency alert message syntax for informing a viewer of an occurrence of a state of emergency, the syntax including an alert priority field for determining processing of the emergency alert message when the message is received, wherein the alert priority field has a predetermined value which indicates a channel change to an emergency broadcast channel and a display of emergency alert contents in text form.

In another aspect of the present invention, a method for processing an emergency alert message comprises the steps of: (a) receiving the emergency alert message including information regarding an emergency broadcast channel to which a current channel is to be compulsorily changed and emergency alert contents in text form in the emergency alert message, when a state of emergency where the channel change to the emergency broadcast channel is required occurs; (b) parsing a channel information field in the received emergency alert message to extract the emergency broadcast channel from the message, and changing the current channel to the extracted emergency broadcast channel; and (c) displaying the emergency alert contents in text form included in the received emergency alert message on a screen of the emergency broadcast channel.

The emergency alert message processing method further comprises the step of parsing an alert priority field in the received emergency alert message to determine whether the channel change to the emergency broadcast channel is required, and performing the step (b) if it is determined that the channel change to the emergency broadcast channel is required.

Preferably, the alert priority field has a predetermined value which indicates both the channel change to the emergency broadcast channel and the display of the emergency alert contents in text form.

In a further aspect of the present invention, a method for processing an emergency alert message comprises the steps of: (a) determining whether a channel change to an emergency broadcast channel is required, if an emergency alert message for informing a viewer of an occurrence of a state of emergency is received; (b) if the channel change to the emergency broadcast channel is determined to be required at the step (a), parsing a channel information field in the received emergency alert message to extract the emergency broadcast channel from the message, and changing a current channel to the extracted emergency broadcast channel; and (c) determining whether emergency alert contents in text form are present in the received emergency alert message; and (d) displaying the emergency alert contents in text form on a screen of the emergency broadcast channel in a scrolling manner if the emergency alert contents are determined to be present in the received emergency alert message at the step (c).

In yet another aspect of the present invention, a cable broadcast receiver comprises: an in-band signal processor for receiving an audio/video (A/V) broadcasting signal and an emergency alert message over in-band; a Point Of Deployment (POD) module for receiving a program and channel associated information, and an emergency alert message over Out-Of-Band (OOB); and an emergency alert message controller for parsing the emergency alert message received by any one of the in-band signal processor and the POD module to determine whether a channel change to an emergency broadcast channel included in the emergency alert message is required, and, if the channel change to the emergency broadcast channel is determined to be required, changing a current channel to the emergency broadcast channel and displaying emergency alert contents in text form on a screen of the emergency broadcast channel if the emergency alert contents are included in the emergency alert message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a table illustrating contents defined by various values of an alert_priority field that determine the processing of an emergency alert message according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A transmitting stage (for example, a broadcasting station) of the present invention is characterized in that it transmits information regarding an emergency broadcast channel to which the current channel is to be compulsorily changed, together with emergency alert contents in text form, when the channel change to the emergency broadcast channel is required.

A receiving stage of the present invention is characterized in that it additionally displays emergency alert contents in text form when the current channel is compulsorily changed to an emergency broadcast channel on the basis of the priority of a received emergency alert message.

Therefore, the viewer can more effectively recognize a state of emergency through emergency alert broadcast of the compulsorily changed emergency broadcast channel which is displayed as a moving image, and the emergency alert contents which are displayed in the form of text. In particular, because a hearing-impaired person cannot hear sound, he/she is able to more securely recognize the state of emergency through the moving image and text.

Figure 1:
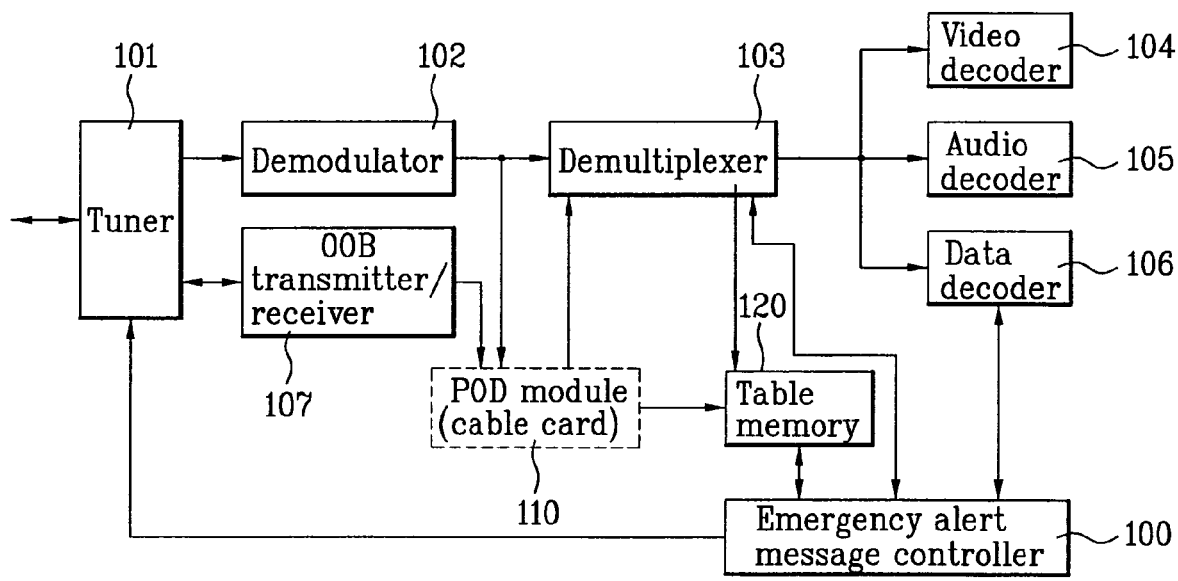
FIG. 1 is a block diagram showing the configuration of a digital cable broadcast receiver according to the present invention.

FIG. 1 is a block diagram showing the configuration of an embodiment of a digital cable broadcast receiver according to the present invention. Here, the transmitting stage of the present invention transmits information regarding an emergency broadcast channel to which the current channel is to be compulsorily changed, together with emergency alert contents in text form, if a state of emergency is so serious as to compulsorily change the current channel to the emergency broadcast channel.

In FIG. 1, the expression of a POD module 110 by a dotted line means that the POD module 110 can be removably inserted in a slot of the body of a cable set-top box by the user. The body in which the POD module 110 is inserted will hereinafter be referred to as a host. The host includes a tuner 101, a demodulator 102, a demultiplexer 103, a video decoder 104, an audio decoder 105, a data decoder 106, an OOB transmitter/receiver unit 107, a table memory 120, and an emergency alert message controller 100.

In the broadcast receiver of FIG. 1 with the aforementioned configuration, an A/V broadcast signal of a specific channel, received over the in-band, is tuned and demodulated through the tuner 101 and demodulator 102 and then outputted in the form of a transport stream.

At this time, the demodulated A/V broadcast signal is inputted to the POD module 100 if the POD module 10 has been inserted, and directly to the demultiplexer 103, otherwise.

If the POD module 110 has been inserted, an emergency alert message and channel and program guide information, tabled according to the SI protocol and transmitted over the OOB, are also inputted to the POD module 110 through the tuner 101 and OOB transmitter/receiver unit 107.

The POD module 110 is adapted to, if the A/V broadcast signal demodulated by the demodulator 102 is in a scrambled state, descramble that signal after subscriber identification, etc., and output the descrambled signal to the demultiplexer 103.

The POD module 110 also parses an SI table, and stores the parsed result in the table memory 120 and, at the same time, outputs the parsed result to the emergency alert message controller 100 if it represents an emergency alert message.

The A/V broadcast signal inputted to the demultiplexer 103 is a multiplexed signal which is in the form of a transport packet. Each packet has a header containing a Packet IDentifier (PID) which indicates whether the contents of the packet are in video stream form or in audio stream form. The PID provides means capable of demultiplexing the multiplexed signal. Namely, the demultiplexer 103 can identify from the PID whether the current packet is a video signal, audio signal or data signal. Accordingly, the demultiplexer 103 separates the inputted A/V broadcast signal into a video signal, an audio signal and a data signal with reference to the PID of each transport packet and outputs the separated video signal, audio signal and data signal to the video, audio and data decoders 104, 105 and 106, respectively.

The video decoder 104 decodes a compression-coded video signal in the reverse of the coding to restore it to the original video signal, and the audio decoder 105 decodes a compression-coded audio signal in the reverse of the coding to restore it to the original audio signal. The data decoder 106 parses data information and stores the parsed result in the table memory 120 through the controller 100. For example, the video decoder 104 may be an MPEG-2 decoder and the audio decoder 105 may be an AC-3 decoder.

On the other hand, in the case where the POD module 110 is not inserted in the host, it is necessary to parse an emergency alert message and channel and program guide information from data information, tabled according to the PSIP and transmitted over the in-band. At this time, the A/V broadcast signal and the data information may be multiplexed and transmitted over the in-band in the form of a transport packet. In this case, the demultiplexer 103 separates the transmitted transport packet into a video signal, an audio signal and a data signal. The emergency alert message, among the parsed table information, is outputted to the emergency alert message controller 100 at the same time as being stored in the table memory 120.

The emergency alert message controller 100 is adapted to process an emergency alert message received over the OOB if the POD module (or cable card) 110 has been inserted, and an emergency alert message received over the in-band if the POD module 110 is not inserted.

That is, if the value of a table_ID field parsed from the data information is 0xD8, the POD module 110 or the demultiplexer 103 regards the contents of the table as those of an emergency alert message and then outputs them to the emergency alert message controller 100.

The emergency alert message controller 100 determines the processing of the received emergency alert message on the basis of the value of an alert_priority field in the emergency alert message. In other words, the emergency alert message controller 100 determines, on the basis of the alert_priority field value, whether the emergency alert message will be disregarded unconditionally or only in a specific condition, or the receiver will be compulsorily tuned to an emergency broadcast channel, or details channel, contained in the emergency alert message.

FIG. 2 is a table illustrating contents defined by various values of the alert_priority field that determine the processing of the emergency alert message according to the present invention.

In FIG. 2, in the case where the alert_priority field value is 0, it means that the received emergency alert message is a test message. In this case, the emergency alert message controller 100 discards the received emergency alert message without processing it.

In the case where the alert_priority field value is 3, the emergency alert message controller 100 processes the received emergency alert message to provide information regarding an emergency alert to the viewer, only when the current channel is not an access-controlled channel. The access-controlled channel is a channel which can be viewed only when the POD module 110 is inserted. For example, when the current channel, being viewed by the viewer, is a broadcast channel descrambled by the POD module 110 and the alert_priority field value of the received emergency alert message is 3, the emergency alert message is disregarded, not processed.

In the case where the alert_priority field value is 7, the emergency alert message controller 100 processes the received emergency alert message to provide information regarding an emergency alert to the viewer, only when the current channel is not a pay-per-view channel.

In the case where the alert_Priority field value is 11, the emergency alert message controller 100 unconditionally processes the received emergency alert message to provide information regarding an emergency alert to the viewer. At this time, if audio is not available for the emergency alert, the emergency alert information is provided to the viewer only in the form of text.

In the case where the alert_priority field value is 15, similarly, the emergency alert message controller 100 unconditionally processes the received emergency alert message to provide information regarding an emergency alert to the viewer. At this time, if necessary, the current channel is compulsorily changed to the emergency broadcast channel. That is, if audio is available for the emergency alert without tuning to the emergency broadcast channel, it may be substituted for audio of the current channel. However, if audio is not available by means other than by tuning to the emergency broadcast channel, the current channel must be unconditionally changed compulsorily to the emergency broadcast channel contained in the received emergency alert message.

In particular, if the alert_priority field value is 15 and emergency alert contents in text form are contained in the received emergency alert message, the emergency alert contents are also displayed together.

As described above, in the case where the alert_priority field value is 15, the current channel is compulsorily changed to the emergency broadcast channel contained in the received emergency alert message so that the viewer can view emergency alert broadcast. Also, the emergency alert contents are provided to the viewer in the form of text.

Figure 3:
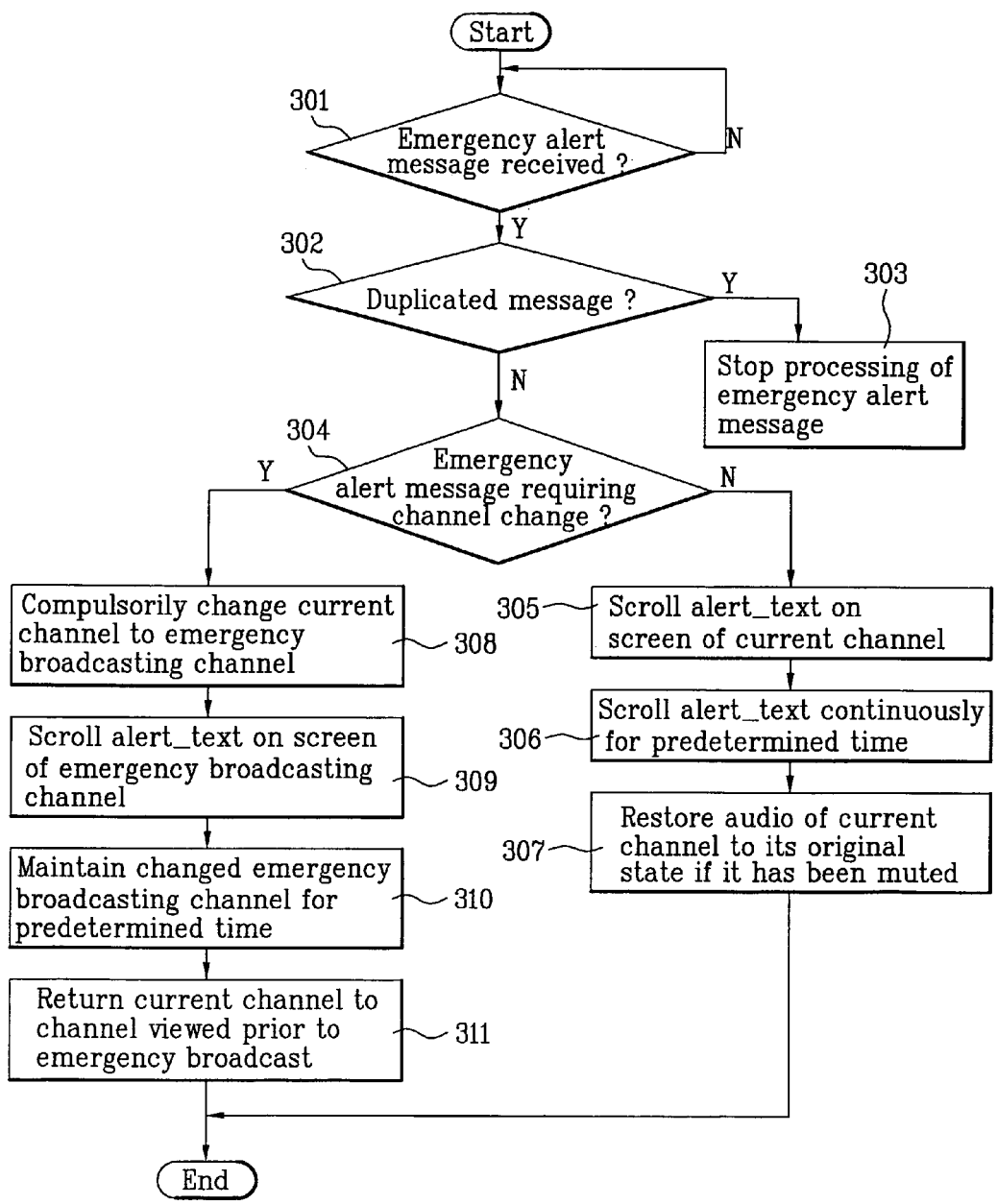
FIG. 3 is a flow chart illustrating a method for processing a received emergency alert message on the basis of the contents defined in the table of FIG. 2.

FIG. 3 is a flow chart illustrating the above-stated emergency alert message processing operation according to the present invention, particularly when the alert_priority field value of the received emergency alert message is 15.

First, if an emergency alert message is received (Step 301), the emergency alert message controller 100 determines whether the received emergency alert message is a duplicate of a previously received emergency alert message (Step 302).

In other words, if an emergency alert message is received, the controller determines whether a band over which the emergency alert message is received differs from a band over which a previous emergency alert message was received. If the two bands differ, the controller clears a sequence_number value to avoid a double message check. On the other hand, if the two bands are the same, the controller determines whether the currently received emergency alert message is the same as the previously received emergency alert message.

For example, if the current emergency alert message is received over the OOB whereas the previous emergency alert message was received over the in-band, or vice versa, the controller clears the sequence$_{13}$ number field value to avoid the double message check. However, if both the previous and current emergency alert messages were received over either the in-band or OOB, the controller determines whether the two emergency alert messages are the same.

If both the previous and current emergency alert messages were received over the same band and the contents thereof are the same, the controller stops the processing of the current emergency alert message (Step 303).

In the case where it is determined at step 302 that the currently received emergency alert message is not a duplicate of the previously received emergency alert message, the controller determines whether the emergency alert message has a priority requiring a compulsory channel change to an emergency broadcast channel contained therein (Step 304).

This determination can be made from the value of an alert_priority field in the emergency alert message received at step 301. For example, in the case where the alert_priority field value is 15 and audio is available for an emergency alert only when the current channel is changed to the emergency broadcast channel, it is necessary to compulsorily change the current channel to the emergency broadcast channel over which a state of the emergency is broadcast.

Upon determining at step 304 that the current channel must be compulsorily changed to the emergency broadcast channel, the controller proceeds to step 308. Otherwise, the controller proceeds to step 305 to display the emergency alert contents in text form without changing the current channel. For example, if the alert_priority field value is 7 and the current channel is not a pay-per-view channel, the controller proceeds to step 305.

At step 305, the controller scrolls the emergency alert contents alert_text in text form on the broadcast screen of the current channel without compulsorily changing the current channel to the emergency broadcast channel. Preferably, the emergency alert contents are scrolled from the upper right to upper left of the screen.

Therefore, the viewer can recognize a state of emergency through the emergency alert contents scrolled on the upper portion of the screen while viewing broadcast of a desired specific channel. At this time, in order to more effectively transfer the state of emergency to the viewer, the audio of the current channel may be automatically muted while the emergency alert contents are scrolled.

The emergency alert contents are continuously scrolled in text form for a predetermined time (Step 306). This scrolling time can be obtained by parsing an alert_message_time_remaining field, event_start_time field and event_duration field of the emergency alert message.

When the display of the emergency alert contents is completed with the lapse of the predetermined time at step 306, the controller restores the audio of the current channel to its original state if it has been muted (Step 307).

On the other hand, in the case where it is determined at step 304 that the emergency alert message has the priority requiring the compulsory channel change to the emergency broadcast channel, the controller compulsorily changes the current channel to the emergency broadcast channel. For example, if the emergency alert message has been received over the in-band, the emergency broadcast channel can be acquired by parsing a details_major_channel_number field and details_minor_channel_number field of the emergency alert message. Alternatively, if the emergency alert message has been received over the OOB, the emergency broadcast channel can be acquired by parsing a details_OOB_source_ID field of the emergency alert message.

At this time, if emergency alert contents in text form are present in the emergency alert message, the controller displays the emergency alert contents on the TV screen where the state of emergency is being broadcast (Step 309). Preferably, the display of the emergency alert contents is performed in a scrolling manner. More preferably, the emergency alert contents are scrolled from the upper right to upper left of the screen.

The compulsorily changed emergency broadcast channel is maintained for a predetermined time (Step 310). Therefore, the viewer can recognize the state of emergency through not only emergency alert broadcast of the emergency broadcast channel which is displayed as a moving image, but also the emergency alert contents which are scrolled on the screen. Similarly, the emergency broadcast channel maintenance time can be obtained by parsing the alert_message_time_remaining field, event_start_time field and event_duration field of the received emergency alert message.

When the predetermined time has elapsed at step 310, the controller stops the scrolling of the emergency alert contents and, at the same time, returns the current channel to a channel that the viewer has viewed prior to the compulsory channel change to the emergency broadcast channel (Step 311).

The terminology used herein includes terms defined taking into consideration functions implemented in the present invention, and the definition thereof may be changed in accordance with the intention of skilled persons in the technical field or the custom in the technical field. Accordingly, the definition of the terminology must be determined based on the whole content of the present invention.

As apparent from the above description, the present invention provides an emergency alert message data structure, an emergency alert message processing method and a broadcast receiver, wherein a transmitting stage transmits emergency alert contents in text form along with emergency broadcast channel information when transmitting an emergency alert message, and a receiving stage displays emergency alert contents in text form over an emergency broadcast channel contained in a received emergency alert message if the emergency alert contents in text form are present in the received emergency alert message when compulsorily changing the current channel to the emergency broadcast channel. Therefore, the viewer can more accurately recognize a state of emergency through not only emergency alert broadcast of the emergency broadcast channel which is displayed as a moving image, but also the emergency alert contents which are scrolled on the screen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A cable broadcast receiver comprising:
   an in-band signal processor for receiving an audio/video (A/V) broadcasting signal and an emergency alert message over in-band;
   a Point Of Deployment (POD) module for receiving a program and channel associated information, and an emergency alert message over Out-Of-Band (OOB); and
   an emergency alert message controller for parsing the emergency alert message received by any one of the in-band signal processor and the POD module to determine whether a channel change to an emergency broadcast channel included in the emergency alert message is required, and, if the channel change to the emergency broadcast channel is determined to be required, changing a current channel to the emergency broadcast channel and displaying emergency alert contents in text form on a screen of the emergency broadcast channel if the emergency alert contents are included in the emergency alert message.

2. The cable broadcast receiver as set forth in claim 1, wherein the POD module can be removably inserted in the cable broadcast receiver.

3. The cable broadcast receiver as set forth in claim 1, wherein the emergency alert message controller is adapted to process the emergency alert message received by the POD module if the POD module is inserted in the cable broadcast receiver, and the emergency alert message received by the in-band signal processor if the POD module is not inserted in the cable broadcast receiver.

4. The cable broadcast receiver as set forth in claim 1, wherein the emergency alert message controller is adapted to parse an alert priority field in the emergency alert message to determine whether the channel change to the emergency broadcast channel is required.

5. The cable broadcast receiver as set forth in claim 4, wherein the alert priority field has a predetermined value which indicates both a compulsory channel change to the emergency broadcast channel and the display of the emergency alert contents in text form.

6. The cable broadcast receiver as set forth in claim 1, wherein the emergency alert message controller is adapted to scroll the emergency alert contents in text form from the upper right to upper left of the screen.

7. In a cable broadcast receiver, a method comprising:
   receiving an audio/video (A/V) broadcasting signal and an emergency alert message over in-band using an in-band signal processor;
   receiving a program and channel associated information and an emergency alert message over Out-Of-Band (OOB), using a Point Of Deployment (POD) module; and
   parsing the emergency alert message received by any one of the in-band signal processor and the POD module, using an emergency alert message controller, to determine whether a channel change to an emergency broadcast channel included in the emergency alert message is required, and, if the channel change to the emergency broadcast channel is determined to be required, changing a current channel to the emergency broadcast channel and displaying emergency alert contents in text form on a screen of the emergency broadcast channel if the emergency alert contents are included in the emergency alert message.

8. The method of claim 7, wherein the POD module can be removably inserted in the cable broadcast receiver.

9. The method of claim 7, wherein the emergency alert message controller is adapted to process the emergency alert message received by the POD module if the POD module is inserted in the cable broadcast receiver, and the emergency alert message received by the in-band signal processor if the POD module is not inserted in the cable broadcast receiver.

10. The method of claim 7, wherein the emergency alert message controller is adapted to parse an alert priority field in the emergency alert message to determine whether the channel change to the emergency broadcast channel is required.

11. The method of claim 10, wherein the alert priority field has a predetermined value which indicates both a compulsory channel change to the emergency broadcast channel and the display of the emergency alert contents in text form.

12. The method of claim 7, wherein the emergency alert message controller is adapted to scroll the emergency alert contents in text form from the upper right to upper left of the screen.

* * * * *